United States Patent
Frechet et al.

(12)

(10) Patent No.: US 6,300,424 B1
(45) Date of Patent: Oct. 9, 2001

(54) HYPERBRANCHED POLYESTERS AND POLYAMIDES

(75) Inventors: Jean M. J. Frechet; Craig J. Hawker; Kathryn Uhrich, all of Ithaca, NY (US)

(73) Assignee: Cornell Research Foundation, Inc., Ithaca, NY (US)

( * ) Notice: Subject to any disclaimer, the term of this patent is extended or adjusted under 35 U.S.C. 154(b) by 0 days.

(21) Appl. No.: 08/094,392

(22) Filed: Jul. 19, 1993

Related U.S. Application Data

(63) Continuation of application No. 07/763,322, filed on Sep. 20, 1991, now abandoned, which is a continuation-in-part of application No. 07/615,398, filed on Nov. 20, 1990, now abandoned.

(51) Int. Cl.[7] ..................................... C08F 20/00
(52) U.S. Cl. .................. 525/444; 528/220; 528/272; 528/295; 528/298; 528/302; 528/308; 528/370; 528/373; 528/397; 525/437
(58) Field of Search ................................ 528/220, 272, 528/295, 298, 302, 308, 370, 373, 397; 525/437, 444

(56) References Cited

U.S. PATENT DOCUMENTS

| | | | |
|---|---|---|---|
| 3,669,939 | * | 6/1972 | Baker et al. . |
| 4,289,872 | * | 9/1981 | Denkewalter et al. ............... 528/328 |
| 4,360,646 | * | 11/1982 | Denkewalter et al. ............... 525/420 |
| 4,410,688 | * | 10/1983 | Denkewalter et al. ............... 528/328 |
| 4,507,466 | * | 3/1985 | Tomalia et al. ...................... 528/332 |
| 4,558,120 | * | 12/1985 | Tomalia et al. ...................... 528/363 |
| 4,568,737 | * | 2/1986 | Tomalia et al. ...................... 528/332 |
| 4,587,329 | * | 5/1986 | Tomalia et al. ...................... 528/363 |
| 4,737,558 | * | 4/1988 | Falcetta et al. ...................... 526/279 |
| 4,857,630 | * | 8/1989 | Kim ....................................... 528/397 |
| 5,041,516 | * | 8/1991 | Frechet et al. ......................... 528/44 |

OTHER PUBLICATIONS

Kricheldorf et al., *Polymer*, vol. 23, p 1821–29, Nov. 1982.*

* cited by examiner

*Primary Examiner*—Samuel A. Acquah
(74) *Attorney, Agent, or Firm*—Bruce F. Jacobs

(57) ABSTRACT

Hyperbranched polyester and polyamide polymers are prepared by a one-step process of polymerizing a monomer of the formula A—R—$B_2$ so that high molecular weight globular polymers having a multiplicity of a particular functional group on the outside surface are obtained.

28 Claims, No Drawings

HYPERBRANCHED POLYESTERS AND POLYAMIDES

CROSS REFERENCE TO RELATED APPLICATION

This is a continuation of application Ser. No. 07/763,322 filed on Sep. 20, 1991 now abandoned; which is a continuation-in-part of U.S. Ser. No. 07/615,398, filed Nov. 20, 1990, now abandoned.

BACKGROUND OF THE INVENTION

The present invention is directed to the preparation of high molecular weight hyperbranched polyester and polyamide polymers. The polymers are produced by a one-step process which entails polymerizing specific monomers of the formula A—R—$B_2$ in such a manner that side-reactions, i.e. reverse reactions, isomerization, crosslinking, and the like are substantially avoided.

P. J. Flory, *J. Am. Chem. Soc.*, 74, 2718 (1952) and *Principles of Polymer Chemistry*, Cornell University Press, 1953, pp. 361–70, discusses the theory of condensation polymerization of so-called $AB_n$-type monomers wherein A and B functions condense together to form branched polymers. While theoretically such polymers should be of high molecular weight, such has not been the case in actual practice. The only specific disclosures of such polymers are obtained by (i) the Friedel-Crafts condensation of benzyl halides in the presence of a $MX_3$ catalyst wherein X is a halogen, (ii) the elimination metal halides from alkali metal salts of trihalophenols, and (iii) intermolecular etherification of D-glucose in the presence of dilute acids to form a soluble polyglucose. Hyperbranched polyester and polyamide polymers are not disclosed. Also, only low molecular weight polymers, i.e. less than about 1,000 daltons, were obtained.

A recent attempt at producing a poly(arylene)polymer by following Flory's theory has also resulted in a polymer having a number average molecular weight below 10,000. Kim et al., *J. Am. Chem. Soc.*, 1990, 112, 4592–3, and Kim U.S. Pat. No. 4,857,630 disclose wholly aromatic poly (arylene) polymers prepared by the homocoupling of (3,5-dibromophenyl) boronic acid in a mixture of an organic solvent and aqueous sodium carbonate along with a palladium-containing catalyst. The molecular weight of the polymer was found to depend on the organic solvent and temperature employed during polymerization and addition of additional monomer at the end of the polymerization neither increased the molecular weight nor gave a bimodal distribution. Kim et al. could not explain what causes the molecular growth of the system to stop. Only low molecular weight polymers, i.e. about 5,000 daltons, were produced. During the polymerization, only single bonds between arylene groups are formed and no polyester or polyamide polymers are disclosed or suggested.

Baker et al. U.S. Pat. No. 3,669,939 discloses condensation polymerizing other $ARB_2$ monomers, i.e. polyhydroxymonocarboxylic acid aliphatic compounds, but only succeeds in generating polymers with molecular weights below 4,000 daltons. While the molecular weights obtained in Baker et al. are not provided, the acid values which are provided permit the calculation thereof.

In view of the previous inability to directly prepare high molecular weight hyperbranched polymers in accordance with Flory's theory, the art is replete with multi-step procedures attempting to accomplish a similar result. For instance, Tomalia et al. U.S. Pat. Nos. 4,507,466, 4,558,120, 4,568,737, 4,587,329, and 4,737,558 disclose dense "starburst" polymers produced by allowing a polyfunctional amide core molecule to react with excess methyl acrylate in a Michel-type addition. Each arm of the resulting star-branched molecule is then reactivated to an amine-terminated moiety by exhaustive amidation using excess 1,2-diaminoethane to afford a chain extended product in which each primary amino group becomes a new branch point in the next series of Michael additions. The polymers are thus built up, layer after layer, from a core substance by selective condensation of functional groups with each successive layer becoming a core for the subsequent layer. Only aliphatic polyamides and polyethers are exemplified and the monomers used are of the A-B type.

Similarly, Denkewalter et al. U.S. Pat. Nos. 4,289,872, 4,360,646 and 4,410,688 disclose highly branched polyamide polymers produced from lysine—an A—R—$B_2$ monomer having one carboxy group, two amino groups, and an aliphatic body—but utilizes a multi-step process of blocking the functional groups and then unblocking them. only relatively low molecular weight polymers were produced due to the inherent difficulty in obtaining complete reaction for each of the multiple of blocking, unblocking, and reacting steps.

Copending application U.S. Ser. No. 07/369,270, filed Jun. 21, 1989, now U.S. Pat. No. 5,041,516, issued Aug. 20, 1991, of Frechet et al. discloses a convergent pathway for preparing dendritic molecules in which accurate placement of one or more functional groups on the outer surface of the macromolecules is accomplished. The convergent approach entails building the final molecule by beginning at its periphery, rather than at its core as in divergent procedures, but still requires a blocking-unblocking multi-step operation, albeit of only a single reactive group at a single focal point which avoids the prior art problem of dealing with a multiplicity of reactive groups as the molecule grows.

Extensive prior art exists on the preparation of linear aromatic polyesters derived from, for example, 4-hydroquinone and phthalic acid or derivatives thereof. Also, Kricheldorf et al., *Polymer Bulletin* 1, 383–388 (1979) discloses preparing linear aromatic polyesters by heating trimethylsilyloxybenzoyl chloride to greater than 150° C. Kricheldorf et al., *Polymer*, 23, 1821–29 (1982) discloses forming predominantly aromatic polyesters from 3-trimethylsilyloxybenzoyl chloride and incorporating small amounts, i.e. 0.6 to 16.6 mole %, of 3,5-bis (trimethylsilyloxy)benzoyl chloride to produce a few branch points. The polyesters so formed behave as predominantly linear polymers since they contain only a few potential branches while the present high molecular weight hyperbranched polyesters behave much more like individual particles.

Accordingly, the art has failed to teach a method which succeeds in producing high molecular weight hyperbranched aromatic polyester and polyamide polymers and it is an object of the present invention to produce such polymers to take advantage of their unique properties, i.e. of high polarity, low crystallinity, and lower than usual viscosity.

SUMMARY OF THE INVENTION

The present invention provides soluble hyperbranched aromatic polyester or aromatic polyamide polymers having at least 40% branching and a molecular weight of at least 10,000 and 1,00 daltons respectively, as determined by gel permeation chromatography with polystyrene calibration.

DESCRIPTION OF THE PREFERRED EMBODIMENT

The soluble hyperbranched polymers of the present invention are derived from monomers of the formula A—R—$B_2$ in which R is or contains an aromatic moiety and A and B are reactive groups that (i) can take part in either an esterification reaction or an amidation reaction and (ii) yield a by-product which is gaseous at the conditions of the reaction.

Suitable aromatic moieties R for use herein include phenyl, napthyl, bi-phenyl, diphenyl ether, diphenyl sulfone, benzophenone, and the like.

Suitable A and B groups for use in preparing the hyperbranched polyesters include trialkylsilyloxy and acid halide wherein the alkyl groups contain about 1 to 4 carbon atoms and the halide is chloride, bromide, or fluoride. Specific such monomers include 3,5-bis(trimethylsilyloxy)benzoyl chloride, 5-trimethylsilyloxy-isophthaloyl dichloride, 3,5-bis(triethylsilyloxy)benzoyl chloride, 3,4-bis(trimethylsilyloxy)benzoyl fluoride, 2,4-bis(triethylsilyloxy)benzoyl bromide, and the like in which the benzoyl group is replaced with other aromatic moieties such as those above.

Suitable A and B groups for use in preparing the hyperbranched polyamides include trialkylsilylamino and acid halide wherein the alkyl groups contain about 1 to 4 carbon atoms and the halide is chloride, bromide, or fluoride. Specific such monomers include 3,5-bis(trimethylsilylamino)benzoyl chloride, 5-trimethylsilylamino-isophthalamino dichloride, 3,5-bis(triethylsilylamino)benzoyl chloride, 3,4-bis(trimethylsilylamino)benzoyl fluoride, 2,4-bis(triethylsilylamino)benzoyl bromide, and the like in which the benzoyl group is replaced with other aromatic moieties such as those above.

The condensation polymerization of the A—R—$B_2$ monomer is preferably performed neat, i.e. in the absence of any solvent, since the presence of a solvent has been found to substantially reduce the molecular weight of the resulting hyperbranched polymer. The polymerization rapidly occurs by heating the monomer to an elevated temperature at which reaction between A and B will occur. The temperature must not be so high as to cause either monomer or polymer decomposition or degradation. Generally a temperature of about 150 to 300° C. will be suitable with the lower temperatures currently preferred for producing higher molecular weight polymers.

The hyperbranched polymers produced herein contain only four different structural units. The first unit is a "focal unit" in which the A group is unreacted and both B groups have reacted. Only a single "focal unit" is present in a polymer molecule. The second unit is a "dendritic repeating unit" in which the A group and both B groups have reacted to form ester or amide linkages. The third unit is a "half-reacted repeating unit" in which the A group and only one of the B groups have reacted while the other B group is unreacted and results in a termination point. The "half-reacting repeating units" reduce the overall degree of branching of the hyperbranched polymer while also contributing to overall growth and the unusual properties of the hyperbranched polymer. The fourth unit is the "terminal unit" in which the A group has reacted but neither of the B groups has reacted.

In the final polymer, it will be quite common for the work-up thereof to hydrolyze or otherwise change the unreacted groups to such as —OH, simple alkoxy groups, or carbamate. Alternatively, after polymerization is complete and before work-up, the hyperbranched polymer may be reacted with a monosubstituted polymer chain terminating compound of the formula Y—$R^1$—A, wherein Y is hydrogen or any functional group which is unreactive under the conditions of the polymerization, $R^1$ is any aliphatic or aromatic moiety, and A is as defined above. Examples of suitable Y groups include such as ester, cyano, ketone, halide, nitro, amide, thioether, sulphonic ester, alkoxy, and the like. Thus, the outer surface of the globular polymer has a multiplicity of a single functional group.

The degree of branching (DB) of the hyperbranched polymers may be determined by the following formula:

$$DB = \frac{(\# \text{ of dendritic repeating units}) + (\# \text{ of terminal units}) + 1}{\text{total \# of units}}$$

wherein the 1 is for the single focal unit since it also contributes to overall branching. As such, the DB must be equal to or less than 1. The % branching is merely DB×100.

The hyperbranched polymers of this invention have a % branching of at least 40%, preferably at least 50%. The % branching for a particular polymer may be controlled. To increase it, for example, a polyfunctional core molecule containing more than two B groups can be used to initiate growth and control subsequent growth; the monomer unit can be added slowly to the reaction mixture rather than all present initially; different reaction conditions can be used; fluoride ion activation with such as CsF, KF, or (n-butyl)$_4$NF as sources of fluoride ion; or the like. To decrease the % branching, small amounts of an A—R—B monomer or a chain terminating compound as described above may be added before or during the polymerization. Generally, however, as high a % branching as possible will be preferred with the theoretical maximum being 100%.

The molecular weight of the hyperbranched polyester polymers is at least 10,000 daltons and the molecular weight of the hyperbranched polyamide polymers is at least 10,000 daltons, both as determined by gel permeation chromatography with polystyrene calibration. The molecular weight of the polyester polymers is preferably at least 20,000 daltons; more preferably at least about 40,000; and still more preferably from about 40,000 to about 200,000 daltons. The molecular weight of the polyamide polymers is preferably from about 1,000 to about 50,000 daltons. In view of the reporting of polystyrene equivalent weights, the actual molecular weight of the polymers may in fact be substantially different from these values.

The hyperbranched polyester or polyamide polymers have a generally globular shape with a substantial number of hydroxyl, amino, carboxylic acid or ester groups located at the outer surface of the globules. The presence of the multiplicity of a single type functional group contributes to the usefulness of the hyperbranched polymers. For instance, when the groups are polar hydroxyl groups, the polymers are particularly useful in coatings since their adhesion to polar surfaces is enhanced over less functional materials. And when the groups are carboxylic acid, they can be transformed to ionic carboxylate units in basic medium to form a dendritic ionomer which will be useful in aqueous medium in coatings, additives, high resistance waxes, rheology control additives, and the like. In addition, the hyperbranched polymers exhibit very low crystallinity, very low compressibility, and a lack of shrinking.

The hyperbranched polymers also exhibit a substantially lower than usual viscosity for such high molecular weight polymers. This is in sharp contrast to the higher viscosity observed with conventional linear and normal lightly branched polyesters and polyamides of lower molecular weight. Accordingly, the hyperbranched polymers are particularly useful in both high solids-contents and dry coatings. Also, due to the fully aromatic structures, the polymers possess high thermal stability.

In addition, the hyperbranched polyester and polyamide polymers are expected to be useful in blends, as rheological modifiers, as stiffening agents, and the like, either alone or in combination with linear and/or lightly branched polyesters, polyamides, polycarbonates, polyphenylene oxides, and the like.

In the following non-limiting examples, all parts and percents are by weight unless otherwise specified.

EXAMPLE I

Preparation of Trimethylsilyl 3,5-bis (trimethylsilyloxy)benzoate

To a solution of 3,5-dihydroxybenzoic acid (50.0 g, 0.32 mol) and trimethylsilyl chloride (113 g, 1.04 mol) in dry toluene (500 ml) was added dropwise triethylamine (108 g, 1.07 mol). The mixture was then heated at refluxed for 3 hours under nitrogen, cooled, filtered and evaporated to dryness. The crude product was purified by distillation and the fraction boiling at 179–190° C. (0.3 mm was collected. The trimethyl silyl ester was obtained as a colorless oil (111 g, 90%).

Preparation of 3,5-bis(trimethylsilyloxy)benzoyl chloride

To a solution of trimethylsilyl ester (42.0 g, 114 mmol) in dry dichloromethane (60 ml) containing trimethylammonium chloride (190 mg, 1.2 mmol) was added freshly distilled thionyl chloride (16.2 g, 136 mmol) dropwise under nitrogen. After the addition was complete, the solution was heated at reflux for three hours, cooled, and evaporated to dryness at room temperature. The crude product was purified by short path distillation at 175° C. (0.3 mm) to give the acid chloride as a pale yellow oil (20.6 g, 65%).

Polymerization of 3,5-bis(trimethylsilyloxy)benzoyl chloride

The purified acid chloride (6.0 g, 19.0 mmol) was heated with stirring under nitrogen in an oil bath at 200° C. for one hour. Vigorous effervescence was observed initially and the reaction mixture solidified after about 30 minutes. After cooling, the residue was dissolved in the minimum amount of pyridine/benzene (1:1, ca. 10 ml) at 50° C. and precipitated into methanol (ca 1000 ml). The precipitated polymer was collected by filtration and dried at 80° C. under high vacuum for 3 days and was obtained as a light brown solid (91% yield). Gel permeation chromatology (with polystyrene calibration) showed that the polymer thus obtained had a weight-average molecular weight $M_w$ of approximately 150,000 and a polydispersity of 3.0. The % branching was 55%.

EXAMPLE II

The procedure of Example I was repeated except that the polymerization was conducted at 250° C. Vigorous effervescence was observed initially and the reaction mixture solidified after ca. 15 minutes. After cooling the residue was dissolved in the minimum amount of pyridine/benzene (1:1, ca. 10 ml) at 50° C. and precipitated into methanol (ca 1000 ml). The precipitated polymer was collected by filtration and dried at 80° C. under high vacuum for 3 days and was obtained as a light brown solid (80% yield). The polymer thus obtained had a $M_w$ of ca. 50,000 (by GPC with polystyrene standards) and a polydispersity of 2.0). The % branching was 55%.

Comparative Example A

The procedure of Example I was repeated except that (i) the purified acid chloride (5.0 g) was dissolved in 1,2-dichlorobenzene solvent (15 ml) prior to commencing the polymerization and (ii) the polymerization was conducted at the reflux temperature of the solvent, 180° C. The resultant polymer was found to have a molecular weight of only about 3,000 (by GPC with polystyrene standards) with about 50% branching.

Comparative Example B

The procedure of Example I was repeated except that the acid chloride was not purified by the short path distillation before polymerization was attempted. The subsequent polymerized material was insoluble and thus no data could be obtained. It was discarded.

Comparative Example C

The purified acid chloride (6.0 g, 19.0 mmol) of Example I was dissolved in dry tetrahydrofuran (THF) solvent (10 ml) and added dropwise to a solution of tetra-n-butylammonium fluoride (1 M sol in THF, 39.0 ml, 39.0 mmol). After stirring at room temperature for 30 minutes, the reaction mixture, which contained a heavy precipitate, was evaporated to dryness and redissolved in methanol (20 ml). The polymer was then precipitated from the methanol solution into a 1:1 mixture of conc. HCl and water. The precipitated polymer was collected by filtration and dried at 80° C. under high vacuum for 3 days. It was obtained as alight brown solid (91% yield). Gel permeation chromatography (with polystyrene calibration) showed the polymer to have a weight-average molecular weight of about 7,000 and a polydispersity of 1.35. The % branching was 50%.

What is claimed is:

1. A hyperbranched aromatic polyester polymer having a weight average molecular weight of at least about 10,000 daltons as determined by gel permeation chromatography with polystyrene calibration, having at least 40% branching, and prepared by a bulk condensation polymerization of a monomer of the formula A—R—$B_2$ wherein (i) R is an aromatic moiety and (ii) A and B are chemical moieties which are reactive with each other to form an ester linkage in an esterification reaction at a temperature of about 150 to 300° C. and which generate a gaseous by-product.

2. The polymer of claim 1 wherein R is selected from the group consisting of phenyl, naphthyl, bi-phenyl, diphenyl ether, diphenyl sulfone, and benzophenone.

3. The polymer of claim 1 wherein A is trialkylsilyloxy wherein the alkyl groups contain about 1 to 4 carbon atoms and B is an acid halide wherein the halide is chloride, bromide, or fluoride.

4. The polymer of claim 1 wherein B is trialkylsilyloxy wherein the alkyl groups contain about 1 to 4 carbon atoms and A is an acid halide wherein the halide is chloride, bromide, or fluoride.

5. The polymer of claim 1 wherein the monomer is a bis(trimethylsilyloxy)benzoyl chloride.

6. The polymer of claim 1 wherein the monomer is 3,5-bis(trimethylsilyloxy)benzoyl chloride.

7. The polymer of claim 1 wherein the molecular weight is at least about 20,000 daltons.

8. The polymer of claim 1 wherein the molecular weight is at least about 40,000 daltons.

9. The polymer of claim 1 wherein the molecular weight is about 40,000 to about 200,000 daltons.

10. The polymer of claim 1 wherein the branching is at least about 50%.

11. The polymer of claim 1 wherein a monomer of the formula A—R—B is copolymerized with the A—R—B$_2$ monomer.

12. The polymer of claim 1 wherein a polyfunctional core monomer having more than two B groups is copolymerized with the A—R—B$_2$ monomer.

13. A hyperbranched polyester polymer containing aromatic rings and having a weight average molecular weight of at least about 10,000 daltons as determined by gel permeation chromatography with polystyrene calibration, having at least 40% branching, and prepared by a condensation polymerization of a monomer of the formula A—R—B$_2$ wherein (i) R contains an aromatic moiety and (ii) A and B are chemical moieties which are reactive with each other to form an ester linkage in an esterification reaction.

14. The polymer of claim 13 wherein the aromatic part of R is selected from the group consisting of phenyl, naphthyl, bi-phenyl, diphenyl ether, diphenyl sulfone, and benzophenone.

15. The polymer of claim 13 wherein the molecular weight is at least about 20,000 daltons.

16. The polymer of claim 13 wherein the molecular weight is at least about 40,000 daltons.

17. The polymer of claim 13 wherein the molecular weight is about 40,000 to about 400,000 daltons.

18. The polymer of claim 13 wherein the branching is at least 50%.

19. The polymer of claim 13 wherein a monomer of the formula A—R—B is copolymerized with the A—R—B$_2$ monomer.

20. The polymer of claim 13 wherein a polyfunctional core monomer having more than two B groups is copolymerized with the A—R—B$_2$ monomer.

21. The polymer of claim 13 wherein the esterification reaction generates a gaseous by-product.

22. A hyperbranched aromatic polyester polymer having a weight average molecular weight of at least about 10,000 daltons as determined by gel permeation chromatography with polystyrene calibration and having at least 40% branching.

23. The polymer of claim 22 wherein the aromatic groups are selected from the group consisting of phenyl, naphthyl, bi-phenyl, diphenyl ether, diphenyl sulfone, and benzophenone.

24. The polymer of claim 22 wherein the molecular weight is at least about 20,000 daltons.

25. The polymer of claim 22 wherein the molecular weight is at least about 40,000 daltons.

26. The polymer of claim 22 wherein the molecular weight is about 40,000 to about 200,000 daltons.

27. The polymer of claim 22 wherein the branching is at least 50%.

28. The polymer of claim 22 which is a copolymer.

* * * * *